United States Patent
Sakurai et al.

(10) Patent No.: US 9,970,817 B2
(45) Date of Patent: May 15, 2018

(54) SPECTROSCOPIC ANALYSIS APPARATUS AND METHOD OF CALIBRATING SPECTROSCOPIC ANALYSIS APPARATUS

(71) Applicant: Seiko Epson Corporation, Tokyo (JP)

(72) Inventors: Kazunori Sakurai, Chino (JP); Hirokazu Kasahara, Okaya (JP)

(73) Assignee: Seiko Epson Corporation (JP)

( * ) Notice: Subject to any disclaimer, the term of this patent is extended or adjusted under 35 U.S.C. 154(b) by 11 days.

(21) Appl. No.: 14/861,063

(22) Filed: Sep. 22, 2015

(65) Prior Publication Data

US 2016/0091369 A1 Mar. 31, 2016

(30) Foreign Application Priority Data

Sep. 30, 2014 (JP) ................................ 2014-200021

(51) Int. Cl.
- *G01J 3/46* (2006.01)
- *G01J 3/28* (2006.01)
- *G01J 3/26* (2006.01)

(52) U.S. Cl.
CPC .. *G01J 3/28* (2013.01); *G01J 3/26* (2013.01)

(58) Field of Classification Search
CPC ......... G01N 21/274–21/278; G01J 3/28; G01J 3/2803; G01J 3/524; G01J 2003/2866–2003/2883; A61B 2560/0228–2560/0233
See application file for complete search history.

(56) References Cited

U.S. PATENT DOCUMENTS

| | | | | |
|---|---|---|---|---|
| 6,045,502 | A | * 4/2000 | Eppstein | A61B 5/0059 600/306 |
| 2007/0061091 | A1 | * 3/2007 | Schweitzer | G01J 3/28 702/76 |
| 2008/0290279 | A1 | * 11/2008 | Juhl | G01J 3/28 250/339.08 |

FOREIGN PATENT DOCUMENTS

| JP | 10-153544 A | 6/1998 |
|---|---|---|
| JP | 10-153545 A | 6/1998 |

OTHER PUBLICATIONS

Busch, Kenneth W., et al. "Wavelength calibration of a dispersive near-infrared spectrometer using trichloromethane as a calibration standard." Applied Spectroscopy 54.9 (2000): 1321-1326.*

* cited by examiner

*Primary Examiner* — Tri Ton
*Assistant Examiner* — Rufus Phillips
(74) *Attorney, Agent, or Firm* — Harness, Dickey & Pierce, P.L.C.

(57) ABSTRACT

A spectroscopic analysis apparatus includes a spectrum measurement unit that measures an optical spectrum of a measurement target, a storage unit that stores reference data in which an intrinsic wavelength with respect to a known component is recorded, a feature specification section that specifies a feature point corresponding to the intrinsic wavelength in the optical spectrum which is measured by using the reference data, and a wavelength correction section that corrects a wavelength of the feature point in the optical spectrum as the intrinsic wavelength.

6 Claims, 5 Drawing Sheets

SPECTROSCOPIC ANALYSIS APPARATUS AND METHOD OF CALIBRATING SPECTROSCOPIC ANALYSIS APPARATUS

BACKGROUND

1. Technical Field

The present invention relates to a spectroscopic analysis apparatus and a method of calibrating a spectroscopic analysis apparatus.

2. Related Art

In the related art, regarding a spectroscopic analysis apparatus, there is a known apparatus which performs wavelength calibration processing when deviation of a wavelength occurs in a spectrum system due to environmental changes and the like (for example, refer to JP-A-10-153544).

JP-A-10-153544 discloses an apparatus in which a wavelength calibration filter is set on an optical path so as to measure a light absorption spectrum for wavelength calibration during the wavelength calibration processing. Then, a peak wavelength of the measured absorption spectrum is detected, thereby specifying an angle of diffraction grating corresponding to the peak wavelength.

Incidentally, in the related art, when performing calibration processing with the spectroscopic analysis apparatus, standard calibration instruments of which optical reflectance and transmitting rates are known, such as a wavelength calibration plate including, for example, the wavelength calibration filter disclosed in JP-A-10-153544 and a white plate are used. However, when the wavelength calibration filter is provided in the apparatus in JP-A-10-153544, there is a disadvantage in that the constitution of the apparatus becomes complicated. Moreover, when the wavelength calibration plate is used, there is a need to set the wavelength calibration plate as an imaging target during measurement, leading to another disadvantage in that calibration processing becomes troublesome.

SUMMARY

An advantage of some aspects of the invention is to provide a spectroscopic analysis apparatus, and a method of calibrating a spectroscopic analysis apparatus, which is simply constituted and is able to easily execute wavelength calibration.

A spectroscopic analysis apparatus according to an application example of the invention includes: a spectrum measurement unit that measures an optical spectrum of a measurement target; a storage unit that stores an intrinsic wavelength with respect to a known component; a feature specification section that specifies a feature point corresponding to the intrinsic wavelength in the optical spectrum; and a wavelength correction section that corrects a wavelength of the feature point in the optical spectrum as the intrinsic wavelength.

According to this application example, the feature point corresponding to the intrinsic wavelength of the known component in the optical spectrum of the measurement target measured by the spectrum measurement unit is specified, and the wavelength of the optical spectrum is corrected while having the feature point as the intrinsic wavelength. The intrinsic wavelength of the known component denotes a specific wavelength which may specify the component, for example, a light absorption wavelength, a reflection wavelength, and a fluorescence wavelength.

In this case, when the optical spectrum of the measurement target is measured, wavelength calibration can be performed by using the intrinsic wavelength stored in the storage unit. Therefore, it is possible to easily execute wavelength calibration without using a wavelength calibration plate such as a white standard plate.

In the spectroscopic analysis apparatus according to the application example, it is preferable to include a correction function calculation section that calculates a correction function approximating a relationship between the intrinsic wavelength and the wavelength of the feature point. It is preferable that the wavelength correction section corrects each wavelength of the optical spectrum based on the correction function.

According to this application example, the correction function representing the relationship between the intrinsic wavelength and the wavelength of the feature point is calculated, and each wavelength in the optical spectrum is corrected based on the correction function. Accordingly, it is possible to perform suitable wavelength calibration with respect to not only the wavelength of the feature point but also a range within a wavelength region having a wide measured optical spectrum.

In the spectroscopic analysis apparatus according to the application example, it is preferable that the spectrum measurement unit measures the optical spectrum by detecting a luminous quantity of light from the measurement target at a first wavelength interval within a predetermined wavelength region from the intrinsic wavelength and detecting a luminous quantity of light from the measurement target at a second wavelength interval which is longer than the first wavelength interval beyond the wavelength region.

According to this application example, the measurement interval (the first wavelength interval) of the luminous quantity within a predetermined wavelength region in the vicinity of the intrinsic wavelength is caused to be shorter than the measurement wavelength interval (the second wavelength interval) of the luminous quantity beyond the wavelength region. Accordingly, measurement accuracy of the spectrum at a portion in which the feature point in the vicinity of the intrinsic wavelength appears in the optical spectrum is improved, and thus, it is possible to accurately detect (specify) the feature point. In addition, it is possible to reduce time taken for measurement by executing measurement of the luminous quantity at the second wavelength interval with respect to the wavelength region away from the intrinsic wavelength.

In the spectroscopic analysis apparatus according to the application example, it is preferable that the storage unit stores a plurality of the intrinsic wavelengths with respect to the known component, and the feature specification section specifies the feature point based on an interval of the plurality of intrinsic wavelengths.

According to this application example, the plurality of intrinsic wavelengths with respect to the known components are stored in the storage unit. For example, components of a substance has a plurality of the light absorption wavelengths, and the light absorption wavelengths become intrinsic values of the component while the interval of the intrinsic wavelengths becomes a determined value. In the application example, in the optical spectrum, the feature point in the optical spectrum is specified by using the intrinsic intervals of the plurality of intrinsic wavelengths of the component. For example, in the optical spectrum, when the peak position at an interval identical to the interval of the light absorption wavelength of the known component appears, the peak position is specified as the feature point. Accordingly, it is possible to easily and accurately specify the feature point of the optical spectrum.

In the spectroscopic analysis apparatus according to the application example, it is preferable that the intrinsic wavelength which is stored in the storage unit includes a spectrum vector, and the feature specification section specifies the feature point by calculating the spectrum vector of the optical spectrum and specifying a spectrum vector which is identical to the spectrum vector in the intrinsic wavelength.

According to this application example, the optical spectrum is analyzed and the spectrum vector of each wavelength region is calculated, thereby specifying a point at which a vector becomes identical to the spectrum vector in the intrinsic wavelength of the known component as the feature point. Accordingly, it is possible to obtain the feature point in a highly accurate manner on account of the shape characteristics of the optical spectrum.

In the spectroscopic analysis apparatus according to the application example, it is preferable to include an illumination spectrum acquisition section that acquires an illumination spectrum of illumination light with which the measurement target is irradiated.

According to this application example, when the peak wavelength is present in illumination light, the peak wavelength of the illumination light is included in the optical spectrum, and thus, detecting the feature point corresponding to the intrinsic wavelength becomes difficult. In contrast, in the application example, the illumination spectrum is acquired by the illumination spectrum acquisition section, and thus, it is possible to divide the peak wavelength of the illumination light so as to specify the feature point. Therefore, it is possible to more efficiently specify the feature point with respect to the light absorption wavelength.

A method of calibrating a spectroscopic analysis apparatus according to another application example of the invention includes a spectrum measurement unit that measures an optical spectrum of a measurement target and a storage unit that stores an intrinsic wavelength with respect to a known component. The method of calibrating a spectroscopic analysis apparatus includes: specifying a feature point corresponding to the intrinsic wavelength in the optical spectrum which is measured by the spectrum measurement unit; and correcting a wavelength of the feature point in the optical spectrum as the intrinsic wavelength.

According to this application example, the feature point corresponding to the intrinsic wavelength of the known component in the optical spectrum is specified, and the wavelength of the optical spectrum is corrected while having the feature point as the intrinsic wavelength. Accordingly, it is possible to easily execute the wavelength calibration without using a wavelength calibration plate such as white standard plate.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment according to the invention will be described.

Figure 1:
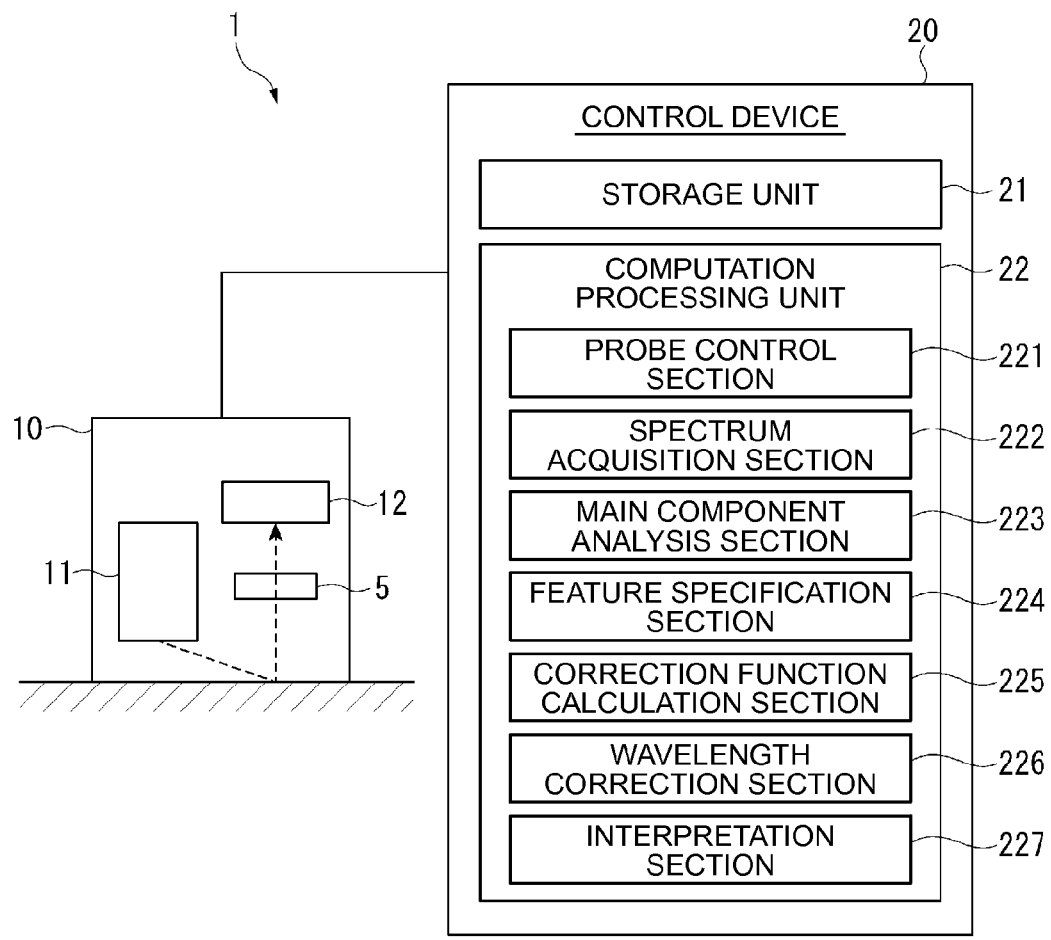
FIG. 1 is a block diagram illustrating a schematic constitution of a biological examination apparatus which is a spectroscopic analysis apparatus of a first embodiment.

FIG. 1 is a block diagram illustrating a schematic constitution of a biological examination apparatus which is a spectroscopic analysis apparatus of the first embodiment.

As illustrated in FIG. 1, a biological examination apparatus 1 of the embodiment includes an optical probe 10 which constitutes a spectrum measurement unit according to the invention, and a control device 20 which executes biological analyses and the like based on a detection signal which is input through the optical probe 10. The biological examination apparatus 1 irradiates, for example, the arm of a measurement target with light, and analyzes components included in a living body by acquiring and analyzing an optical spectrum thereof. As an example, the embodiment exemplifies a constitution of measuring the oxygen saturation of blood flowing inside a human body.

Constitution of Optical Probe

As illustrated in FIG. 1, the optical probe 10 includes a light source section 11, a wavelength tunable interference filter 5, and a light reception section 12.

More specifically, the optical probe 10 includes a probe case (not illustrated). For example, the probe case is constituted with a light shielding member, and an open window is provided in a portion thereof. Then, the light source section 11, the wavelength tunable interference filter 5, and the light reception section 12 are arranged so as to face the open window.

The light source section 11 irradiates the measurement target with light through the open window of the probe case. Regarding light in performing irradiation, it is acceptable as long as the light includes an absorption wavelength (an intrinsic wavelength) of a component of the analysis target when executing a component analysis. For example, irradiation of light within a range from the visible light region to the near infrared light region is performed.

The wavelength tunable interference filter 5 is a spectrum element, which allows light having a predetermined wavelength to transmit therethrough, in reflected light from the measurement target.

Figure 2:
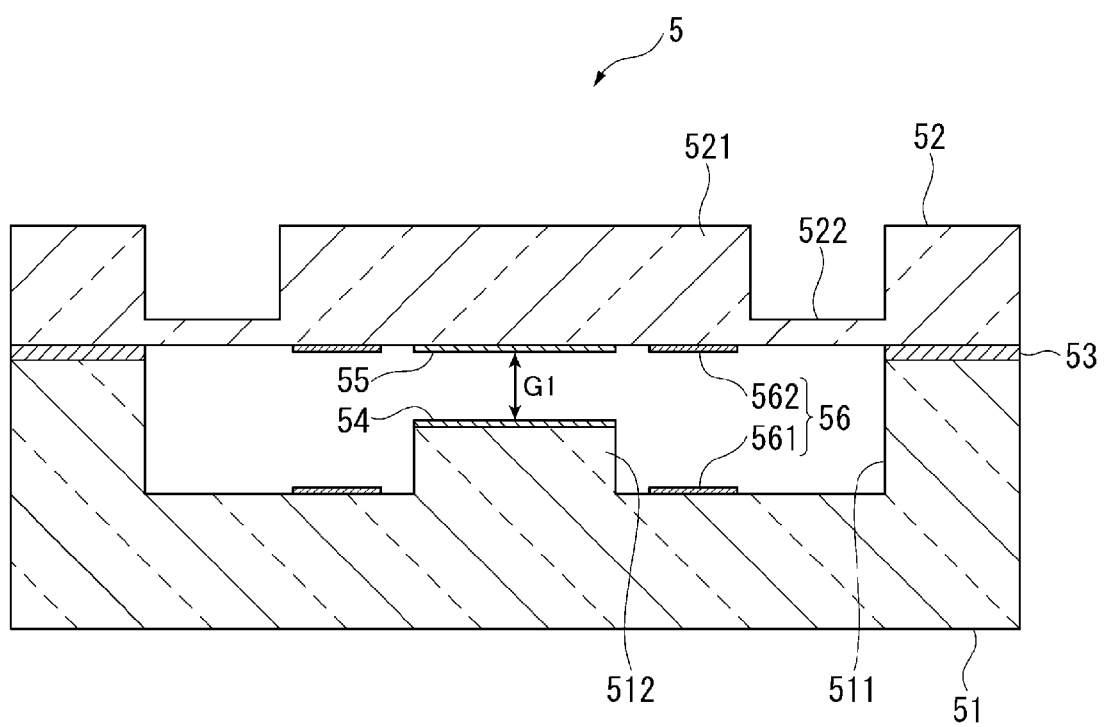
FIG. 2 is a sectional diagram illustrating a schematic constitution of a wavelength tunable interference filter in the first embodiment.

FIG. 2 is a sectional diagram illustrating a schematic constitution of the wavelength tunable interference filter 5.

The wavelength tunable interference filter 5 includes a fixed substrate 51 and a movable substrate 52 which are light transmissive. For example, the fixed substrate 51 and the movable substrate 52 are bonded together by using a bonding film 53 which is constituted with a plasma polymerized film and the like having siloxane as the main component, thereby being integrally constituted. In such a wavelength tunable interference filter 5, the element can be reduced in size compared to a case of using an acousto-optic tunable filter (AOTF) or a liquid crystal tunable filter (LCTF) as the spectrum element, for example, and thus, miniaturization of the optical probe 10 can be achieved.

The fixed substrate 51 includes an electrode arrangement groove 511 which is formed by performing etching, and a reflective film installation portion 512. The electrode arrangement groove 511 is provided with a fixed electrode 561, and the reflective film installation portion 512 is provided with a fixed reflective film 54.

The fixed electrode 561 is annularly formed so as to surround the reflective film installation portion 512 in the electrode arrangement groove 511, for example.

As the fixed reflective film 54, for example, a metal film formed of Ag and the like, or an alloy film formed with a Ag alloy and the like can be used. In addition, for example, a dielectric multi-layered film including a high refractive layer formed of $TiO_2$ and a low refractive layer formed of $SiO_2$ may be used. Moreover, a reflective film in which the metal film (or the alloy film) is stacked on the dielectric multi-layered film, a reflective film in which the dielectric multi-layered film is stacked on the metal film (or the alloy film), a reflective film in which a mono-layered refractive layer (formed of $TiO_2$, $SiO_2$, or the like) and the metal film (or the alloy film) are stacked, and the like may be used.

As illustrated in FIG. 2, the movable substrate 52 includes a movable portion 521 and holding portions 522 which are provided outside the movable portion 521 and hold the movable portion 521.

The movable portion 521 is formed so as to be greater in thickness than the holding portion 522. For example, in the embodiment, the movable portion 521 is formed to have a thickness identical to the thickness of the movable substrate 52. The movable portion 521 is formed to have a diameter greater than at least the diameter of an outer peripheral edge of the reflective film installation portion 512 in a planar view of the filter. The movable portion 521 is provided with a movable electrode 562 and a movable reflective film 55.

The movable electrode 562 is provided at a position facing the fixed electrode 561. In addition, the movable reflective film 55 is arranged at a position facing the fixed reflective film 54 via a gap G1. As the movable reflective film 55, a reflective film which has the constitution identical to that of the above-described fixed reflective film 54 is used.

The holding portion 522 is a diaphragm which surrounds the periphery of the movable portion 521 and is formed so as to be smaller in thickness than the movable portion 521. Such a holding portion 522 is more likely than the movable portion 521 to be bent, and thus, the movable portion 521 can be displaced to the fixed substrate 51 side even by slight electrostatic attraction. Accordingly, the gap G1 can vary in size in a state where parallelism between the fixed reflective film 54 and the movable reflective film 55 is maintained.

In the embodiment, the diaphragm-like holding portion 522 is exemplified. However, the embodiment is not limited thereto. For example, the embodiment may adopt a constitution in which beam-like holding portions are arranged at equal angle intervals centering on the plane-center point.

In the above-described wavelength tunable interference filter 5, electrostatic actuators 56 are constituted with the fixed electrode 561 and the movable electrode 562, and the electrodes 561 and 562 are connected to the control device 20 via a voltage control circuit (a driver, not illustrated). As a voltage is applied to the electrostatic actuators 56 from the voltage control circuit while being controlled by the control device 20, electrostatic attraction acts between the electrodes 561 and 562 in response to the voltage, and thus, the gap G1 between the reflective films varies in size. Accordingly, it is possible to change the wavelength of light transmitted through the wavelength tunable interference filter 5.

Returning to FIG. 1, the light reception section 12 receives light transmitted through the wavelength tunable interference filter 5 and outputs a detection signal to the control device 20 in accordance with a received luminous quantity. As the light reception section 12, for example, an image sensor can be used. In this case, an image signal is output to a control unit.

Constitution of Control Device

Subsequently, the control device 20 will be described.

As illustrated in FIG. 1, the control device 20 includes a storage unit 21 and a computation processing unit 22.

For example, the storage unit 21 is constituted with a memory, a hard disk drive, and the like. The storage unit 21 stores an operating system (OS), various programs, and various items of data for controlling the overall operation of the biological examination apparatus 1.

As the aforementioned data, the storage unit 21 stores V-λ, data for driving the electrostatic actuators 56 of the wavelength tunable interference filter 5.

In addition, the storage unit 21 stores reference data in which the intrinsic wavelength with respect to each of the components that becomes an analysis target is recorded.

Figure 3:
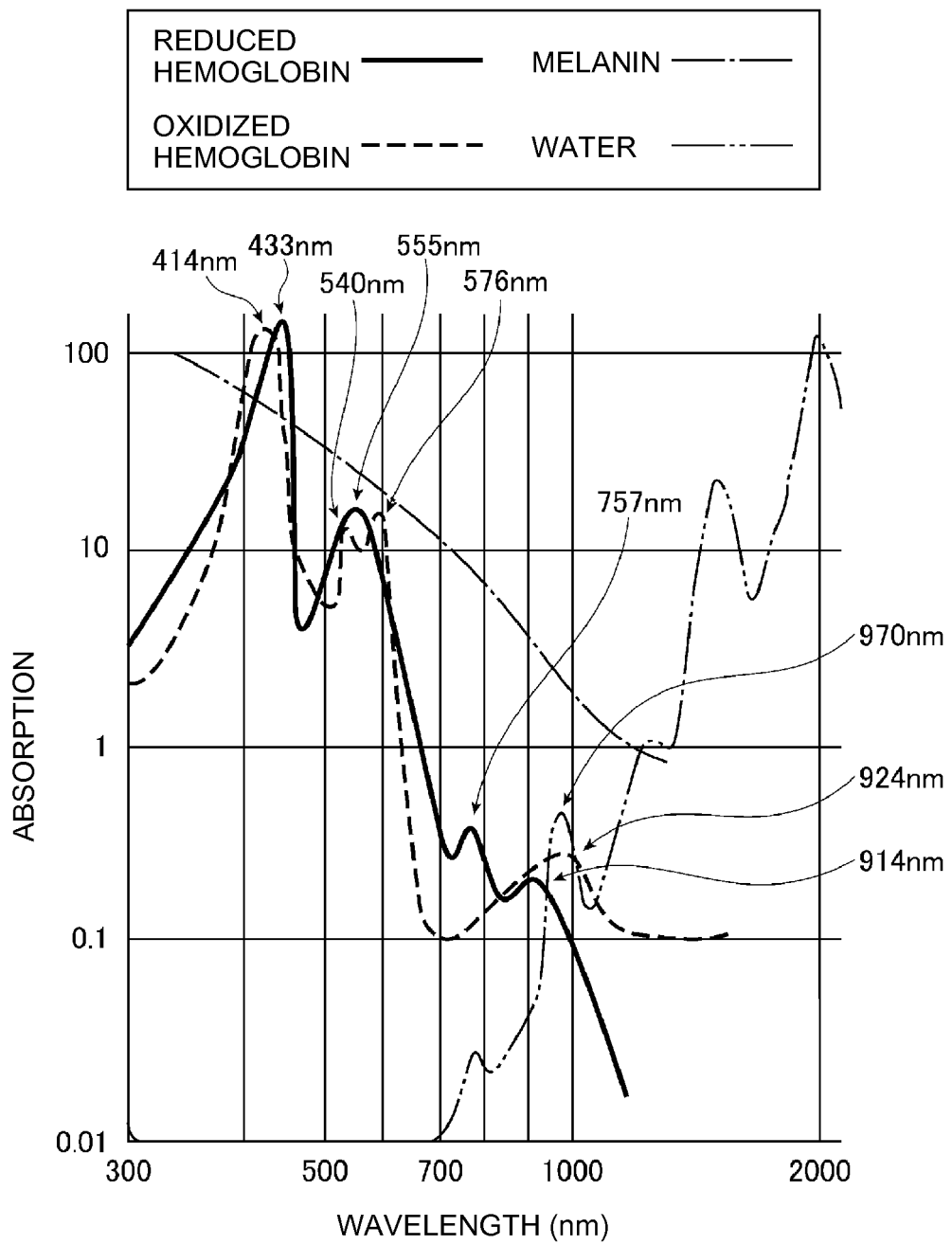
FIG. 3 is a diagram illustrating an example of reference data in the first embodiment.

FIG. 3 is an example of the reference data. As illustrated in FIG. 3, each of the components has a plurality of the intrinsic absorption wavelengths. For example, oxidized hemoglobin has the absorption wavelengths at 414 nm, 540 nm, 576 nm, and 924 nm, and reduced hemoglobin has the absorption wavelengths at 433 nm, 555 nm, 757 nm, and 914 nm. In the reference data, a light absorption spectrum having the absorption wavelengths as the intrinsic wavelengths is recorded.

Moreover, the storage unit 21 stores a spectrum of illumination light (an illumination spectrum) which is emitted from the light source section 11. In other words, a peak wavelength of illumination light is stored.

For example, the computation processing unit 22 is constituted with a computation circuit such as a central processing unit (CPU), and a storage circuit. The computation processing unit 22 reads and executes the various programs stored in the storage unit 21, thereby functioning as a probe control section 221, a spectrum acquisition section 222, a main component analysis section 223, a feature specification section 224, a correction function calculation section 225, a wavelength correction section 226, and an interpretation section 227 as illustrated in FIG. 1.

The probe control section 221 constitutes the spectrum measurement unit according to the invention together with the optical probe 10 and the spectrum acquisition section 222. Specifically, the probe control section 221 drives the light source section 11 and performs irradiation of illumination light toward the measurement target through the optical probe 10. In addition, the probe control section 221 applies a voltage corresponding to an objective wavelength, with respect to the electrostatic actuators 56 of the wavelength tunable interference filter 5 based on the V-λ data which is stored in the storage unit 21. The probe control section 221 causes light having the objective wavelength to transmit through the wavelength tunable interference filter 5. Moreover, the probe control section 221 drives the light reception section 12 and detects a luminous quantity of light having the objective wavelength transmitted through the wavelength tunable interference filter 5. In addition, the probe control section 221 successively changes a drive voltage applied to the electrostatic actuators 56, thereby changing the objective wavelength of the light transmitted through the wavelength tunable interference filter 5 at wavelength intervals which are set in advance. Accordingly, optical components (luminous quantity) in each wavelength at the wavelength intervals are acquired in light reflected by the measurement target.

The spectrum acquisition section 222 acquires the optical spectrum of the measurement target based on a detection signal which is input from the light reception section 12.

The main component analysis section 223 executes a main component analysis with respect to the optical spectrum which is acquired by the spectrum acquisition section 222, thereby dividing the optical spectrum into a plurality of spectrum components.

The feature specification section 224 compares the intervals of peak positions in interpreted spectrum components and the intervals of the intrinsic wavelengths in the reference data, thereby specifying the peak position which becomes a feature point. In other words, the positions of the light absorption wavelengths of the components in the optical spectrum are specified so as to correspond to each other.

The correction function calculation section 225 calculates a correction function for correcting a shift amount of the wavelength in the optical spectrum based on the feature point (the measurement wavelength position) specified by the feature specification section 224, and the light absorption wavelength corresponding to the feature point.

The wavelength correction section 226 calculates the correction optical spectrum which is obtained by correcting each wavelength in the optical spectrum, based on the calculated correction function.

The interpretation section 227 interprets each of the components included in a living body, based on the calculated correction optical spectrum.

Method of Analyzing Spectrum in Biological Examination Apparatus 1

Subsequently, a method of analyzing a spectrum (including a calibration method) in the above-described biological examination apparatus 1 will be described.

Figure 4:
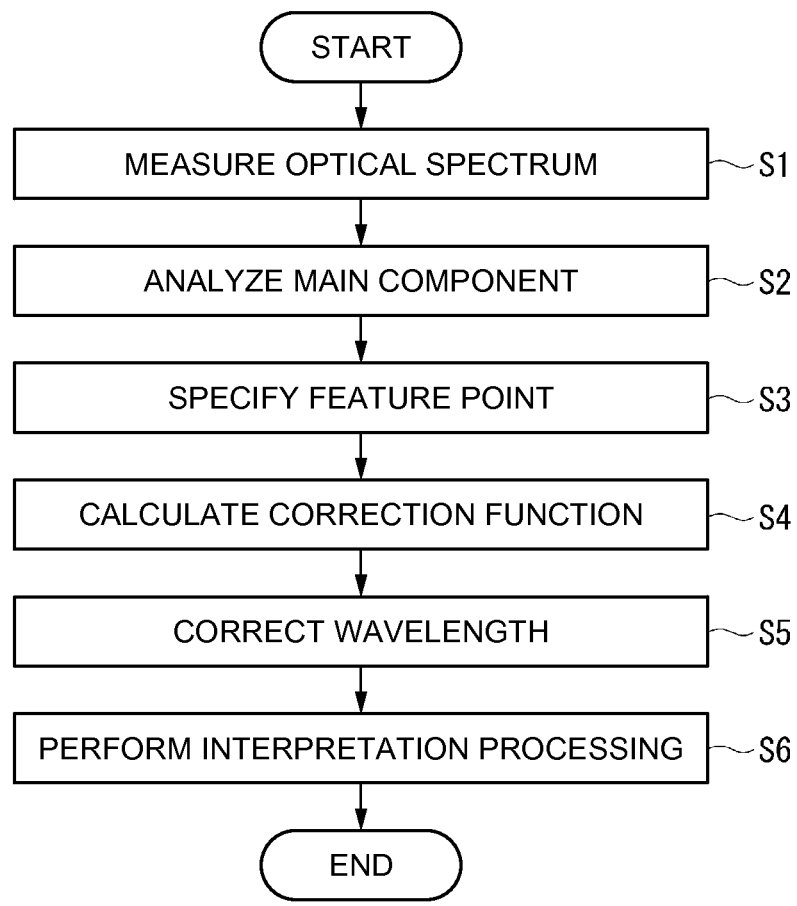
FIG. 4 is a flow chart illustrating a method of analyzing a spectrum of the first embodiment.

FIG. 4 is a flow chart illustrating the method of analyzing a spectrum of the embodiment.

First, the biological examination apparatus 1 of the embodiment measures the optical spectrum of a measurement target (Step S1). In other words, a measurer pressedly puts the open window of the optical probe 10 on the skin (for example, the arm) of a living body which is the measurement target, operates an operation unit (not illustrated) provided in the control device 20, and inputs an instruction to start measurement. Accordingly, the probe control section 221 drives the light source section 11 so as to perform irradiation of illumination light and successively changes the drive voltage applied to the electrostatic actuators 56 of the wavelength tunable interference filter 5. Accordingly, the wavelength of transmitted light which has transmitted through the wavelength tunable interference filter 5 successively changes, and the probe control section 221 individually detects a luminous quantity of the transmitted light having each wavelength. Then, the spectrum acquisition section 222 measures the optical spectrum of the measurement target based on the detected luminous quantity in each wavelength.

In the embodiment, in Step S1, the measurement wavelength interval is narrowed in the vicinity of each intrinsic wavelength (the absorption wavelength) which is recorded in the reference data, and the measurement wavelength interval is widened with respect to the other wavelength regions. For example, when 414 nm and 433 nm are recorded in the reference data, the measurement interval is set to 5 nm within the wavelength bandwidth of 20 nm, for example, centering on 414 nm and 433 nm, and the interval is set to 20 nm in other wavelength bandwidths. Accordingly, highly accurate measurement of the optical spectrum can be performed in the vicinity of the light absorption wavelength, and thus, it is possible to improve processing accuracy in Steps S2 and S3 described below.

The measurement of the optical spectrum is executed with respect to measurement spots at a plurality of points (for example, three spots). In this case, the measurement spot may be changed by an operation of a measurer, and for example, in the optical probe 10, the positions or the postures of the wavelength tunable interference filter 5 and the light reception section 12 may be changed. For example, the latter case can be realized by providing a movement mechanism for moving the wavelength tunable interference filter 5 and the light reception section 12 or a turning mechanism for changing an optical axis direction, in the optical probe 10.

In addition, when acquiring a captured image by using the image sensor as the light reception section 12, the optical spectrum may be acquired with respect to each of a plurality of pixels. In this case, it is no longer necessary to perform the above-described operation by the measurer, or to have the above-described constitution in which the movement mechanism or the turning mechanism is provided.

Thereafter, the main component analysis section 223 executes the main component analysis with respect to the plurality of the optical spectra which are measured in Step S1, and the peak positions constituting the optical spectrum are divided into the plurality of spectrum components different from one another (Step S2). For example, the main component analysis section 223 divides the optical spectra into the plurality of spectrum components so as to cause the peak positions (the peak wavelengths) to be at an interval of 1 nm. In addition, processing of Step S2 is executed with respect to each of the optical spectra which are measured with respect to the plurality of measurement points.

Then, the feature specification section 224 specifies the peak position which coincides with the interval of the light absorption wavelengths of each component in the reference data from the peak wavelengths of each spectrum component which are divided in Step S2, as the feature point (Step S3). In this case, the feature specification section 224 can specify the accurately measured feature point of the optical spectrum by acquiring the irradiation spectrum of the light source section 11 stored in the storage unit 21 and specifying the intrinsic wavelengths such as the peak wavelengths of illumination light. In other words, the feature specification section 224 also functions as an illumination spectrum acquisition section according to the invention.

For example, as illustrated in FIG. 3, oxidized hemoglobin has the absorption wavelengths at 414 nm, 540 nm, 576 nm, and 924 nm, and the wavelength intervals thereof become 126 nm, 36 nm, and 348 nm. Meanwhile, when oxidized hemoglobin is included in the measurement target, the absorbed amount of light having the aforementioned wavelength components increases, and the luminous quantity of the wavelength components in the measured optical spectra decreases. Therefore, among the spectrum components having each of the wavelengths divided in Step S2, the feature specification section 224 specifies four spectrum components which have not received many luminous quantities of the peak positions compared to other spectrum components, and of which the wavelength intervals become 126 nm, 36 nm, and 348 nm, thereby specifying the peak position as the feature point. The following Table 1 shows an example of the intrinsic wavelengths (the absorption wavelengths included in the reference data) and the measured absorption peak wavelengths (the wavelengths specified as the feature point in Step S3). For example, the measured absorption peak wavelengths include errors caused by deviation of the wavelengths of light which is actually emitted from the wavelength tunable interference filter 5 with respect to the V-λ, data due to factors of environmental changes and the like. Therefore, as shown in Table 1, there is an occurrence of deviation between the intrinsic wavelength and the actual measured wavelength of light.

In this Step S3, specification of the feature point is executed with respect to the optical spectra in the plurality of measurement points measured in Step S2. Therefore, other common wavelength components (for example, the wavelength components of illumination light or the wavelength components with respect to other components which are not recorded in the reference data) which are different from the light absorption wavelengths can be removed from the optical spectra. Accordingly, it is possible to more accurately specify the feature point corresponding to the light absorption wavelength.

TABLE 1

| intrinsic wavelength (absorption wavelength) (nm) | measured absorption peak wavelength (nm) |
| --- | --- |
| 540 | 524 |
| 555 | 539 |
| 576 | 559 |
| 757 | 737 |
| 914 | 891 |
| 924 | 901 |
| 970 | 946 |

Subsequently, the correction function calculation section 225 calculates the correction function for correcting the shift amount of the wavelengths of the optical spectra based on the absorption wavelengths included in the reference data and the wavelengths specified in Step S3 (Step S4).

Figure 5:
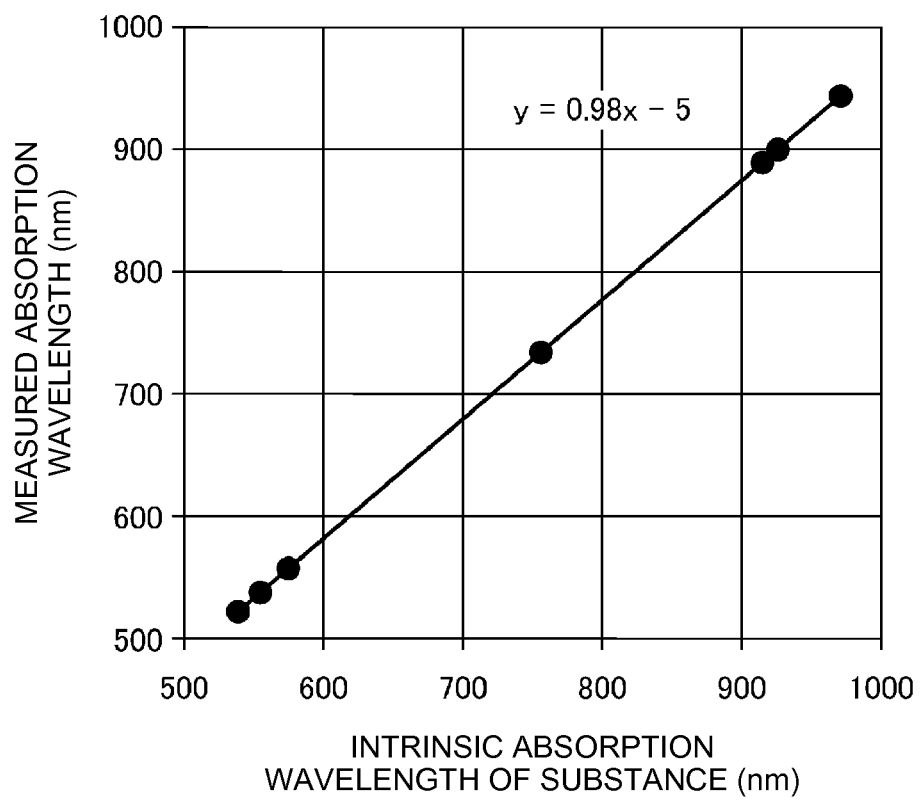
FIG. 5 is a diagram in which an intrinsic wavelength and a measured wavelength of a feature point are correlated to each other in the embodiment.

FIG. 5 is a diagram in which the intrinsic wavelengths and the measured wavelengths of the feature point (including an error) are correlated to each other.

FIG. 5 is the graph of the example of the above-described Table 1. In this case, as illustrated in FIG. 5, the correction function calculation section 225 calculates the linear line passing through each point by using the method of least squares, for example, thereby obtaining the correction functions.

The correction functions are not limited to be obtained by the linear equation as illustrated in FIG. 5. For example, since there is a case where the shift amount of the wavelength increases as the wavelength becomes longer (or shorter), higher-order correction functions may be calculated by a quadratic or higher equation in such a case.

Thereafter, the wavelength correction section 226 corrects each wavelength in the optical spectra based on the correction functions calculated in Step S4 (Step S5). Accordingly, it is possible to correct not only the above-described feature point but also each of the measurement wavelengths in the optical spectra.

Then, the interpretation section 227 interprets a content rate and the like of the components included in the measurement target, based on the optical spectra which are corrected in Step S5 (Step S6). In the embodiment, the content rates of oxidized hemoglobin, reduced hemoglobin, water, and the like are calculated based on absorbance of each absorption wavelength, and blood oxidization levels are calculated based on a ratio of oxidized hemoglobin and reduced hemoglobin. Since a known technique can be adopted when calculating the content rates of each component, the descriptions thereof will not be repeated herein.

Operational Effect of First Embodiment

In the biological examination apparatus 1 of the embodiment, the intrinsic wavelengths (the absorption wavelengths) in the components included in the measurement target is stored in the storage unit 21 as the reference data, and the feature specification section 224 specifies the feature point which is the position with respect to the intrinsic wavelength, from the actually measured optical spectrum and the reference data. Then, the wavelength correction section 226 corrects the optical spectrum by correcting the specified wavelength of the feature point to be the intrinsic wavelength.

Accordingly, without separately using a standard calibration plate such as a white plate, the measured optical spectra can be suitably and easily corrected in a simple constitution.

In the biological examination apparatus 1 of the embodiment, the correction function calculation section 225 calculates the correction functions representing the relationships between the intrinsic wavelengths of the reference data and the measurement wavelengths of the measured feature point, and the wavelength correction section 226 corrects each wavelength of the optical spectrum based on the correction function.

Accordingly, in the optical spectrum, it is possible to correct not only the positions of the intrinsic wavelengths such as the absorption wavelengths but also other wavelengths by using the correction function so as to be the exact wavelengths, and thus, measurement accuracy of the optical spectrum can be improved. Therefore, in interpretation processing as well, the interpretation section 227 can accurately execute the interpretation processing by using the optical spectrum, and thus, it is possible to obtain an exact analysis result.

In the biological examination apparatus 1 of the embodiment, when measuring the optical spectrum of the measurement target in Step S1, in the vicinity of each of the intrinsic wavelengths which are recorded in the reference data, the measurement wavelength interval is narrowed, and the measurement wavelength interval is widened with respect to the other wavelength regions. Accordingly, when dividing the optical spectrum into wavelength components separately in Step S2, the wavelength components can be divided in the vicinity of the intrinsic wavelength in a highly accurate manner, and thus, specification accuracy of the feature point in Step S3 can be improved. In addition, compared to a case where the measurement wavelength interval is narrowed in the entire wavelength region, reduction of the measurement time can be achieved.

In the biological examination apparatus 1 of the embodiment, the illumination spectrum (the light-emitting spectrum of the light source section 11) of illumination light which is emitted from the light source section 11 is stored in the storage unit 21. Therefore, when detecting the feature point, the illumination spectrum of the illumination light is removed from the optical spectrum by the feature specification section 224 so that the feature point with respect to the intrinsic wavelength can be specified, and thus, it is possible to improve specification accuracy (detection accuracy) of the feature point.

Second Embodiment

Subsequently, a second embodiment according to the invention will be described.

The first embodiment describes the example in which the feature specification section 224 specifies the feature point based on the interval of the intrinsic wavelengths in a specific component. In contrast, the present embodiment is different from the first embodiment in a point of specifying the feature point based on spectrum vectors of the optical spectra.

The embodiment has a constitution similar to that of the above-described first embodiment. However, there is a difference in the reference data stored in the storage unit as well as the processing contents of the feature specification section 224. Therefore, hereinafter, descriptions will be given with reference to FIG. 1 similarly to the first embodiment.

In the embodiment, the intrinsic wavelengths of each component which becomes the analysis target, and their spectrum vectors (the reference spectrum vectors) are recorded as the reference data stored in the storage unit 21.

In addition, the main component analysis section 223 of the embodiment classifies the optical spectra into vectors in a space (target spectrum vectors) of the same dimension as the band number thereof when performing the main component analysis of the optical spectra.

Then, the feature specification section 224 of the embodiment calculates angles (the spectrum angles) of the reference spectrum vectors and the target spectrum vectors so as to determine similarity between both thereof. In other words, the feature specification section 224 specifies the target spectrum vector in which the spectrum angle is minimized, as the feature point.

Therefore, the wavelength correction section 226 corrects the wavelength of the target spectrum vector which is specified as the feature point, to be the wavelength of the reference spectrum vector.

In the embodiment, the feature point is specified based on the spectrum vector. In other words, the target spectrum vector in the optical spectra similar to the reference spectrum vector is specified, and the wavelength is caused to correspond thereto while having the target spectrum vector as the vector corresponding to the reference spectrum vector. Accordingly, it is possible to accurately correct each wavelength in the optical spectra.

Other Embodiments

The invention is not limited to the above-described embodiments. The invention includes changes, modifications, and the like within a scope in which the advantages of the invention can be achieved.

In the first embodiment, the wavelength calibration is executed after executing the main component analysis. However, the embodiment is not limited thereto. For example, as described above in the embodiments, when it is known that the measurement target is a blood vessel blood under the skin of a human body, the main component analysis does not need to be performed, and the reference data in which the standard shapes of the optical spectra of the measurement target and the positions of the intrinsic wavelengths with respect to the optical spectra are recorded in advance may be used. In other words, since the measured optical spectrum has the shape which is substantially identical to the shape of the spectrum in the reference data, the wavelengths can be corrected by adjusting the intrinsic wavelengths of the peak point and the like. In this case as well, it is possible to perform highly reliable correction of the wavelength by correcting the wavelengths with respect to the plurality of measurement points.

The above-described embodiment describes the example in which the spectrum of illumination light is stored in the storage unit 21 in advance. However, the embodiment is not limited thereto. For example, the spectrum of the illumination light may be constituted so as not to be stored in the storage unit 21. In addition, when external light other than light from the light source section 11 is used as illumination light, the spectrum of illumination light may be separately obtained by performing measurement.

The above-described embodiment describes the example in which the measurement wavelength interval is narrowed in the vicinity of the intrinsic wavelength, and the measurement wavelength interval is widened with respect to other wavelength regions. However, for example, the optical spectra may be measured at the same measurement wavelength interval in the overall measurement wavelength intervals.

The above-described embodiment describes the example in which the correction function is calculated by the correction function calculation section 225. However, the embodiment is not limited thereto. For example, when the necessary wavelength is only the intrinsic wavelengths in the reference data, there is no need to correct the wavelengths with respect to the overall wavelengths in the optical spectra by using the correction functions. In this case, there is no need to calculate the correction functions.

The above-described embodiment describes the example of the biological examination apparatus 1 which is used as the spectroscopic measurement apparatus. However, the embodiment is not limited thereto. For example, a calorie measurement apparatus and a food ingredient analysis apparatus may be used while adopting other measurement targets as the measurement target such as food.

In addition, the absorption wavelength is exemplified as the intrinsic wavelength. However, the embodiment is not limited thereto.

For example, when measuring the optical spectrum of the measurement target emitting the fluorescence wavelength, by performing irradiation with excitation light having predetermined wavelengths, the fluorescence wavelengths may be stored as the intrinsic wavelengths. In addition, when measuring the optical spectra of the measurement target which exhibit strong reflectance properties with respect to only predetermined wavelengths, the reflection wavelengths may be recorded as the intrinsic wavelengths.

As a method of specifying the feature point by using the feature specification section 224, the example describes that the plurality of spectrum components are extracted by performing the main component analysis and the spectrum component having the peak wavelength corresponding to the intrinsic wavelength is specified from the spectrum components. In contrast, for example, the optical spectrum may be differentiated twice so as to detect the inflection points, and a point corresponding to the intrinsic wavelength among the inflection points may be specified as the feature point.

The above-described embodiments have illustrated the example in which the wavelength tunable interference filter 5 is used in the optical probe 10 constituting the spectrum measurement unit. However, the embodiments are not limited thereto. AOTF or LCTF may be used as the spectrum element which is provided in the optical probe 10. Otherwise, grating and the like may be used.

Furthermore, the specific structure for executing the invention can be appropriately changed to other structures and the like within a scope in which the advantages of the invention can be achieved.

The entire disclosure of Japanese Patent Application No. 2014-200021 filed on Sep. 30, 2014 is expressly incorporated by reference herein.

What is claimed is:

1. A spectroscopic analysis apparatus comprising:
a light source that emits a light toward a target object;
a variable wavelength filter that receives a reflected light from the target object and that exits a filtered light;
a light detector that is configured to detect the filtered light and to output a detected signal corresponding to the detected filtered light;
a memory that stores a plurality of intrinsic wavelengths of a known component with respect to the target object and that stores a plurality of reference spectrum vectors corresponding to the plurality of intrinsic wavelengths; and
a processor, the processor being configured to:
acquire an optical spectrum based on the detected signal, the optical spectrum having a plurality of feature points, the optical spectrum having a plurality of target spectrum vectors;
obtain spectrum angles between the plurality of target spectrum vectors and one of the plurality of reference spectrum vectors so as to determine a smallest spectrum angle within the spectrum angles; and
correct a wavelength of the optical spectrum based on wavelengths corresponding to the plurality of feature points and the plurality of intrinsic wavelengths,
wherein the processor is configured to identify a first target spectrum vector of the plurality of target spectrum vectors having the smallest angle with respect to the one of the plurality of reference spectrum vectors as a corresponding feature point of the plurality of feature points, and the first target spectrum vector corresponds to a first intrinsic wavelength of the plurality of intrinsic wavelengths, and
the processor is configured to correct the wavelength of the optical spectrum to the first intrinsic wavelength based on the corresponding feature point.

2. The spectroscopic analysis apparatus according to claim 1,
wherein the processor is configured to calculate a correction function approximating a relationship between the plurality of intrinsic wavelengths and the wavelengths corresponding to the plurality of feature points, and
the processor is configured to correct the wavelength of the optical spectrum based on the correction function.

3. The spectroscopic analysis apparatus according to claim 1,
wherein the processor is configured to acquire the optical spectrum based on the detected signal corresponding to a luminous quantity of reflected light from the target object at a first wavelength interval within a first predetermined wavelength region which starts from one of the plurality of intrinsic wavelengths, and
the processor is configured to acquire the optical spectrum based on the detected signal corresponding to a luminous quantity of the reflected light from the target object at a second wavelength interval which is longer than the first wavelength interval, the second wavelength interval is within a second predetermined wavelength region which is located outside of the first predetermined wavelength region.

4. The spectroscopic analysis apparatus according to claim 1,
wherein the processor is configured to specify one of the plurality of feature points based on an interval of the plurality of intrinsic wavelengths.

5. The spectroscopic analysis apparatus according to claim 1,
wherein the memory stores an illumination spectrum of the light that is emitted from the light source, and
the processor is configured to specify one of the plurality of feature points based on the illumination spectrum.

6. A method of calibrating a spectroscopic analysis apparatus, the spectroscopic analysis apparatus includes:
a light source that emits a light toward a target object;
a variable wavelength filter that receives a reflected light from the target object and that exits a filtered light;
a light detector that is configured to detect the filtered light and to output a detected signal corresponding to the detected filtered light;
a memory that stores a plurality of intrinsic wavelengths of a known component with respect to the target object, and that stores a plurality of reference spectrum vectors corresponding to the plurality of intrinsic wavelengths; and
a processor that is configured to acquire an optical spectrum based on the detected signal, the optical spectrum having a plurality of feature points, the optical spectrum having a plurality of target spectrum vectors, the method comprising:
obtaining spectrum angles between the plurality of target spectrum vectors and one of the plurality of reference spectrum vectors so as to determine a smallest spectrum angle within the spectrum angles by the processor;
identifying a first target spectrum vector of the plurality of target spectrum vectors having the smallest angle with respect to the one of the plurality of reference spectrum vectors as a corresponding feature point of the plurality of feature points, and the first target spectrum vector corresponds to a first intrinsic wavelength of the plurality of intrinsic wavelengths; and
correcting a wavelength of the optical spectrum to the first intrinsic wavelength based on the corresponding feature point.

* * * * *